Feb. 16, 1971　　　E. D. WILLIS　　　3,562,855
SCALLOP PROCESSING

Filed May 27, 1968　　　　　　　　　　6 Sheets-Sheet 1

INVENTOR
ELMER D. WILLIS

*Finnegan, Henderson & Farabow*
ATTORNEY

Feb. 16, 1971  E. D. WILLIS  3,562,855
SCALLOP PROCESSING

Filed May 27, 1968  6 Sheets-Sheet 2

INVENTOR
ELMER D. WILLIS

Finnegan, Henderson & Farabow
ATTORNEYS

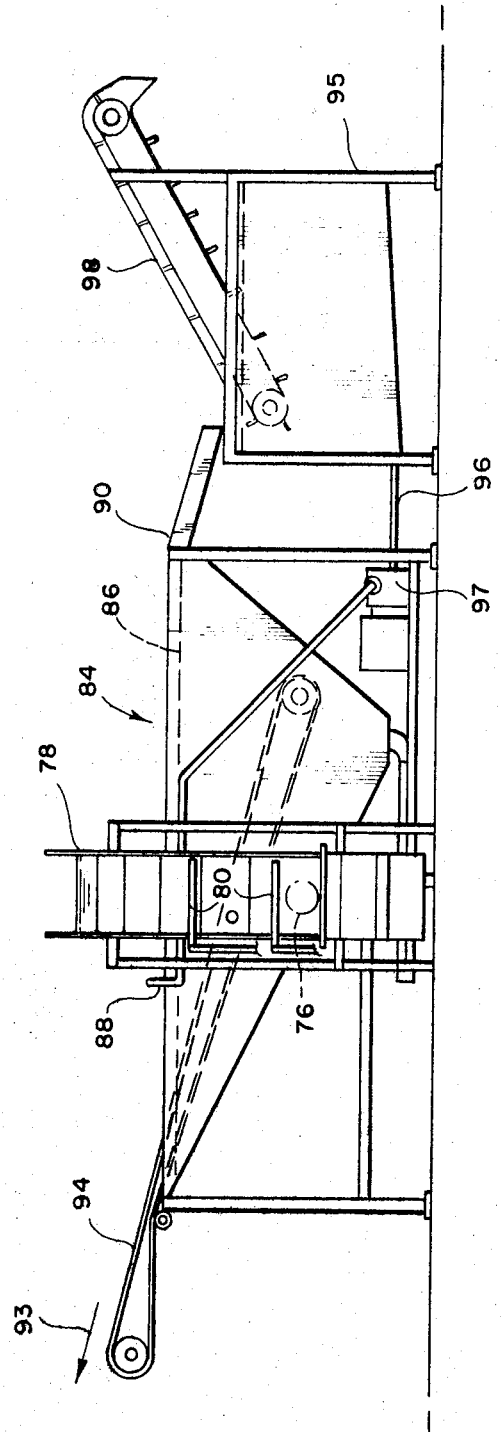

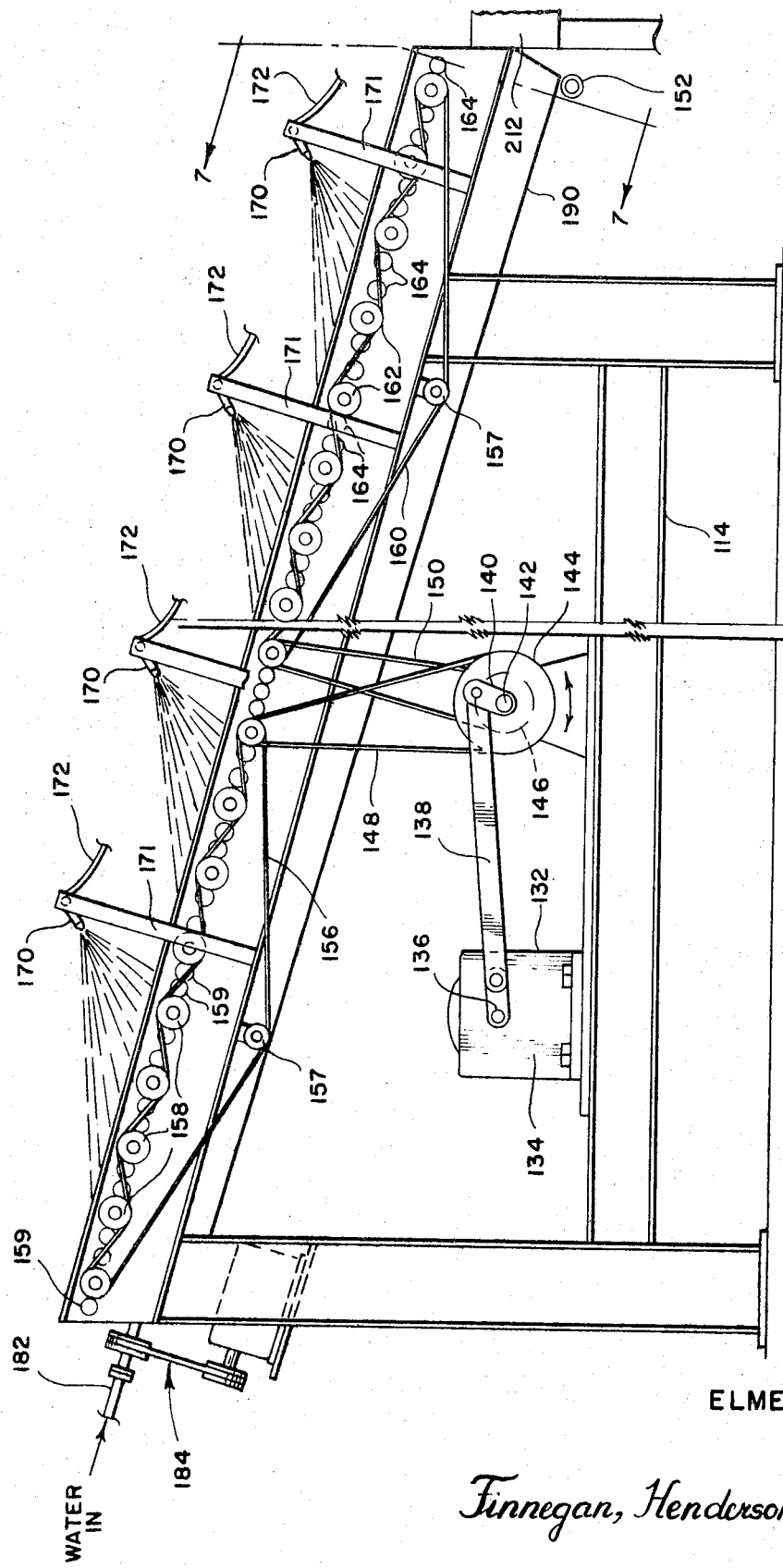

Feb. 16, 1971  E. D. WILLIS  3,562,855
SCALLOP PROCESSING

Filed May 27, 1968  6 Sheets-Sheet 5

INVENTOR
ELMER D. WILLIS

Finnegan, Henderson & Farabow
ATTORNEYS

Feb. 16, 1971  E. D. WILLIS  3,562,855
SCALLOP PROCESSING

Filed May 27, 1968  6 Sheets-Sheet 6

INVENTOR
ELMER D. WILLIS

Finnegan, Henderson & Farabow
ATTORNEYS

United States Patent Office 3,562,855
Patented Feb. 16, 1971

3,562,855
SCALLOP PROCESSING
Elmer Dryden Willis, Williston, N.C., assignor to Willis Bros., Inc., Williston, N.C., a corporation of North Carolina
Filed May 27, 1968, Ser. No. 732,247
Int. Cl. A22c 29/00
U.S. Cl. 17—48                                         6 Claims

ABSTRACT OF THE DISCLOSURE

A method and apparatus are provided for extracting the adductor muscle from scallops. Scallops are subjected to a heat shock and are then mechanically agitated to disengage the muscle and attached viscera from the shell. The muscle and viscera are removed from the shells and separated from unfragmented portions of the shells on a vibrating screen and are then contacted with water before being separated from small shell fragments by flotation in a brine solution. Viscera is removed from the muscles by pulling on the viscera while restraining movement of the muscles. The invention also includes a method and apparatus for removing viscera from the adductor muscle of shucked scallops. Scallop muscles and attached viscera are placed on the upper surface of an inclined path formed by a plurality of rollers. Viscera is pulled from the scallop muscle and through the nip formed by adjacent rollers by rotating the upper portion of adjacent rollers towards each other. Detached viscera is cleaned from the rolls below the inclined path. Advance of scallop muscles down the path is controlled by intermittently rotating the upper portion of adjacent rollers away from each other to permit the lower of the adjacent rollers to advance the muscle down the path and by spraying a flow of fluid on at least some of the muscles on the path to affect their rate of movement down the path.

---

This invention relates to the processing of scallops, and more particularly relates to methods and apparatus for extracting the adductor muscle from scallops.

The preparation of scallops for human consumption involves shucking, the separation of the adductor muscle from the shells, and eviscerating, the separation of the adductor muscle from the viscera which clings to the periphery of the muscle. Although the viscera of scallops is usually considered to be edible, only the cylindrical adductor muscle is commonly sold for human consumption.

Historically, the shucking and eviscerating of scallops has been performed by hand on a piece-work basis. A 1961 amendment to the Fair Labor Standards Act of 1938 for the first time made minimum wage provisions applicable to the seafood industry and had a direct effect in raising the labor costs of hand shucking and eviscerating to very high levels.

The increased labor costs particularly affected the feasibility of hand processing Calico scallops which are found in abundance off the Atlantic Coast of Florida. The adductor muscle of the Calico scallop is very small and shucking and eviscerating by hand are so time consuming in relation to yield that hand processing these scallops became economically impractical because of the minimum wage law.

Since the extension of the minimum wage law to the seafood industry, there has been a continuing intensive search for commercially feasible mechanical methods of processing scallops. However, problems involved in both the shucking and eviscerating operations have delayed the mechanization of scallop processing on a commercial scale.

Separation of the adductor muscle from the shell of scallops by mechanical methods has previously tended to produce large quantities of small shell fragments that interfere with the subsequent mechanical eviscerating of the scallops.

While cooking of the scallops permits relatively easy removal of the muscle from the shell, it is desirable to process scallops in the fresh, uncooked condition as there is a large market for this form of product and it brings a high price.

Several attempts have been made to produce mechanical eviscerators, but to date no method or apparatus for eviscerating scallops has been developed that is capable of processing a large volume of scallops on a commercial basis. Previous scallop eviscerators have not handled a large volume of muscle per hour and left large quantities of viscera remaining on the scallop muscle which has necessitated further hand eviscerating.

Another problem that has been encountered in prior art eviscerating methods and apparatus is the tendency to mutilate and destroy large quantities of the scallop muscle.

Still another problem which has been encountered with many apparatusses for eviscerating scallops has been frequent shutdowns for cleaning or servicing of the equipment.

Accordingly, the present invention, as embodied and broadly described, provides a method for extracting the adductor muscles from scallops comprising immersing the unshucked scallops in a hot liquid bath for a time period sufficient to lessen the adhesion of the adductor muscle and the shell, but insufficient to substantially denature the muscle protein, mechanically agitating the shell and muscle to cause the release of the muscle and attached viscera from the shell; separating large shell fragments from the muscle and viscera; floating the muscle and viscera in a brine solution to separate small shell fragments from the muscle and viscera, and removing the viscera from the muscle by placing the scallop muscle and attached viscera on the upper surface of an inclined path formed by a plurality of rollers having their axes transverse of the path, pulling the viscera from the scallop muscles and through the nip formed by adjacent rollers by rotating the upper portion of adjacent rollers towards each other, and removing the viscera from the surface of the rollers below the inclined path.

The invention also includes an apparatus for extracting the adductor muscles from other components of scallops comprising an immersion tank containing a quantity of hot liquid sufficient to permit immersion of the scallops; conveying means for transporting the scallops from the hot liquid a predetermined time after immersion in the tank to preclude cooking of the muscle: a vibratory shaker for receiving heated scallops from the conveying means and separating the scallop meat from the shell, said shaker including a perforated plate having openings of a size that will allow passage of the muscle and attached viscera of the scallop, but will not allow passage of the unfragmented valves of the shell, a flotation tank for receiving the muscle and viscera from the strainer means and separating the muscle and viscera from shell fragments; the flotation tank containing a liquid having a specific gravity greater than the specific gravity of the meat and viscera and less than the specific gravity of the shell to permit the muscle and viscera to float and to permit any shell fragments to settle, the flotation tank including means for feeding muscle and attached viscera to an eviscerating zone; and an eviscerator for separating the muscle from the viscera, the eviscerator comprising at least one pair of rollers in parallel adjacent relationship to provide a nip, drive means for oscillating the rollers so that the upper portions of the rollers are alternately rotated towards each other to pull viscera from the scallop muscles and through the nip of the rollers and alternately rotated away from each other, and cleaning means for removing viscera from the rollers.

Another form of the invention includes a method of separating the adductor muscle from the viscera of a shucked scallop which comprises placing the scallop muscle and attached viscera on the upper surface of an inclined path formed by a plurality of rollers having their axes transverse of the path; pulling the viscera from the scallop muscles and through the nip formed by adjacent rollers by rotating the upper portion of adjacent rollers towards each other; removing the viscera from the surface of the rollers at a point below the inclined path; and controlling the advance of scallop muscles down the path by intermittently rotating the upper portion of adjacent rollers away from each other to permit the lower of the two adjacent rollers to advance the muscle down the path, and by spraying a flow of fluid on the muscles to affect their rate of movement down the path.

The invention also includes an apparatus for separating the adductor muscles from the viscera of shucked scallops comprising: a plurality of rollers arranged to form an inclined path descending from the input end of the eviscerator. Each of the rollers has its axis aligned transversely of the path and is positioned so that the surface of each intermediately positioned roller forms a nip with the adjacent roller on its input side and a nip with the adjacent roller on its output side. Drive means are provided for oscillating the rollers so that the upper exposed portion of adjacent rollers are alternately rotated towards each other to pull viscera from the scallop muscles and through the nip of the rollers, and alternately rotated away from each other to permit the lower roller to advance the scallop down the inclined path. Spray means are positioned above the inclined path for controlling the residence time of the scallops on the eviscerator by directing a fluid under pressure at the scallops positioned on the rollers. Cleaning means are provided for removing the viscera from the underside of the rollers.

It is to be understood that both the foregoing general description and the following detailed description are exemplary and explanatory but are not restrictive of the invention.

The accompanying drawings, which are incorporated in and constitute a part of this invention, illustrate a preferred embodiment of the invention, and together with the description, serve to explain the principles of the invention.

Of the drawings:

FIG. 3 is a front elevation of the apparatus illustrated in FIG. 2 with the vibratory shaker omitted;

FIG. 4 is a side elevation view of the eviscerator of this invention with the splash cover removed to show the drive means;

Figure 1:
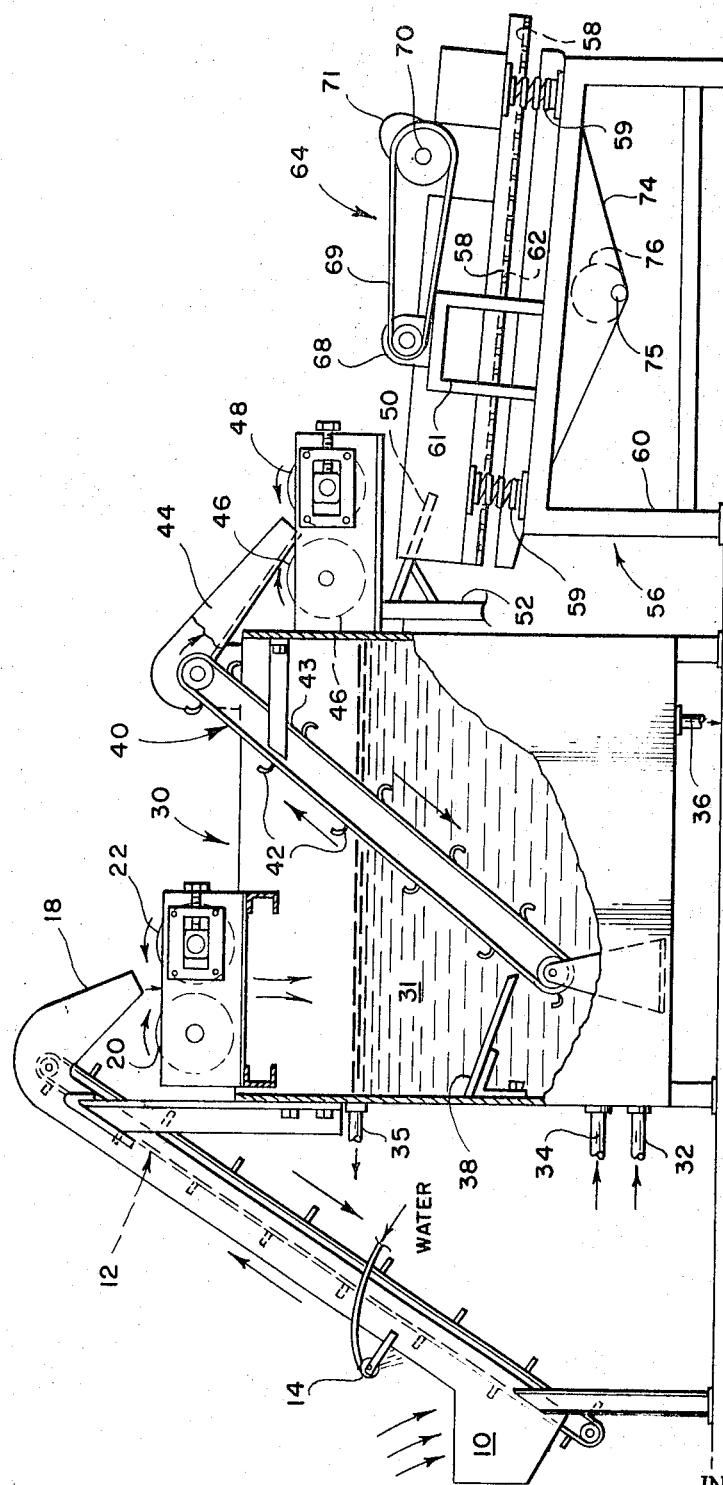
FIG. 1 is a schematic elevation, partly in section, of the first portion of an apparatus for extracting adductor muscles from the scallops constructed in accordance with the invention.

The present method of extracting the adductor muscle of an unshucked scallop is applicable to scallops generally, including sea scallops, *Placopecten magellanicus;* bay scallops, *Aequipecten irradians;* and Calico scallops, *Aequipecten gibbus.* While the different varieties of scallops vary in size, their similar physiology allows them to be processed according to the methods of the invention.

As used in the specification and claims, the term "valve" refers to one of the two major parts of the scallop shell, and the term scallop "meat" refers collectively to the adductor muscle and viscera.

It is desirable that the scallops be alive at the beginning of the processing operations because the organoleptic-quality and the microbiological purity of the product are then superior. However, scallops which have recently expired can be processed according to the methods of the invention.

Scallops, after being harvested by dredging or the like, may have sand or other foreign matter on the exterior of their shells. Consequently, it is sometimes desirable to wash the exterior of the scallop shells with water to remove the foreign matter before processing according to the invention. It is also sometimes desirable to mildly agitate the scallops prior to processing according to the invention, particularly when the scallop is processed within a short time after it is harvested from the sea.

In accordance with the method of the invention, unshucked scallops are immersed in a hot liquid bath for a time period sufficient to at least partially release the adductor muscle from the shell, but insufficient to substantially denature the muscle protein. Preferably, the hot liquid in which the scallops are immersed is water held at 180°–200° F. to provide a heat shock to the scallop. At these bath temperatures, the preferred immersion times are from 6–9 seconds. Optimum results are obtained by immersing the scallops for about 7 seconds in 195° F. water. Under the preferred conditions, the adhesion of the adductor muscle to the shell is substantially lessened, but the scallop muscle does not absorb enough heat to be cooked.

The scallop muscle and shell are subsequently mechanically agitated to cause the release of the muscle and attached viscera from the shell. While the agitation must be vigorous to ensure release of the adductor muscle from the shell, it is desirable to avoid excessive agitation or crushing which would fragment the shells. Preferably, the mechanical agitation separates the two valves of the bivalves to ensure release of the muscle and viscera from the shell, but does not further reduce the size of the shell so that the bulk of the shell material can be easily screened to separate it from the muscle and viscera.

The valves and any large shell fragments resulting from agitation of the bivalve are separated from the muscle and viscera, preferably on a vibrating screen that has openings which will pass the muscle and viscera but will not pass the unfragmented valves, comprising the shell of the bivalve, which are discarded.

Muscle and attached viscera from the vibrating screen are preferably contacted with a stream of water to wash them and preferably to also carry them from the vibrating screen by fluming. During the agitation of the scallops and the separation of the muscle and viscera from the shell, the muscle and viscera may contact the outer side of the shells and pick up sand, etc. which is conveniently removed by the water stream.

The muscle and attached viscera are strained from the stream of water and subsequently floated in a brine solution to permit small shell fragments to separate therefrom and to settle.

Viscera is removed from the relatively clean and shell-free muscle by exerting a frictional pulling force on the viscera in a given direction while restraining movement of the muscle in that direction.

The invention also provides a new method of separating the adductor muscle from the viscera of scallops. The eviscerating method is useful for separating the adductor muscle from the attached viscera of scallops shucked by a variety of methods including hand shucking, but is most advantageously used in combination with the procedure set forth above. It is desirable that the scallop meats to be eviscerated by the process of the invention be free of shell fragments and sand because these materials would interfere with the process.

According to the eviscerating method of this invention, scallop meats are placed on the upper surface of an inclined path formed by a plurality of rollers having their axes transverse of the path. The initial orientation of scallop muscles on the path is immaterial, as the cylindrical adductor muscle is soon oriented by the rollers so that the axis of the muscle is generally parallel to the rollers. In this position, the muscle rotates about its axis, generally in the direction of the rotation of the lower of two adjacent rollers forming a nip, and exposes the viscera around substantially its entire periphery to the nip formed by each pair of adjacent rollers.

According to the invention, the viscera is pulled from the muscle and through the nip formed by adjacent rollers by rotating the upper portion of adjacent rollers towards each other. The rollers exert a frictional pulling force on the viscera in a downward direction through the nip of the rollers while at the same time restraining movement of the scallop muscle in that direction.

The rollers are oscillated (counter rotated) so that they alternate between pulling viscera from the muscle and advancing the muscles down the path. The degree of rotation of the upper portion of the rollers towards each other is preferably at least 360° for rollers at the top of the path, but the degree of rotation of rollers located lower in the path can be reduced below 360°.

According to the invention, viscera are removed from the surface of the rollers at a point below the inclined path. Thus, the rollers physically separate and also effectively segregate the muscle and viscera. Preferably, the removal of the viscera from the rollers is accomplished by directing a stream of water under pressure at the underside of the rollers forming the inclined path.

In accordance with the eviscerating method of the invention, the advance of scallop muscle down the inclined path is controlled by intermittently rotating the upper portion of adjacent rollers away from each other to permit the lower roller of each pair of adjacent rollers to advance the muscle down the path, and by spraying a flow of fluid on some of the muscles to affect their rate of movement down the path. Both the frequency and degree of rotation of the upper portion of the rolls away from each other affect the rate of movement of the scallops. Increasing the frequency and the degree of rotation of the upper portion of the rolls away from each other both tend to decrease the residence time of the muscle on the path.

The spraying of fluid on the muscles to affect their rate of movement down the path is preferably effected by spraying water over a substantial area of the path. By directing the water spray upwardly in relation to the path, the movement of the muscles down the path can be impeded. Directing the water spray downwardly in relation to the path decreases the residence time of the muscles on the path. A further benefit of the use of a water spray on top of the rollers is the tendency of the water to form a continuous film that helps ensure that the scallop muscles rotate about their cylindrical axes and expose their entire peripheral surface to the pulling action of the rollers.

Reference will now be made in detail to the present preferred embodiment of the apparatus for accomplishing the methods of the invention. An example of this apparatus is illustrated in the accompanying drawings.

FIGS. 1, 3, and 4 in sequence illustrate a preferred physical arrangement of an apparatus embodying the principles of the invention. Initially, as seen in FIG. 1, the scallops are placed in a feed hopper 10 which feeds the bivalves to a brine tank feed elevator, generally 12. Elevator 12 is preferably a flighted endless belt conveyor with a belt of open mesh steel construction. Drive means (not shown) is provided for moving the belt at a given speed. The belt speed and the capacity of the flights to hold scallops during their upward travel determines the maximum feed rate of scallops to an immersion tank, described below.

A water spray bar 14 is positioned above elevator 12 to direct a spray of water on scallops being transported up the elevator. The spray from bar 14 removes sand and other foreign material which may be present on the outside of the bivalves. The water, sand, and foreign matter pass through the open mesh conveyor and are discarded.

Elevator 12 discharges the scallops by gravity onto a chute 18 which is inclined to drop the scallops between a pair of drum rollers 20 and 22. These rollers are driven to counter-rotate by drive means (not shown) to mildly agitate the scallops and to impart a mechanical shock to the scallop muscle. The upper portions of the rollers are rotated towards each other, a direction of rotation that coincides with the direction of movement of the scallops through the rolls.

The space between the drums of rollers 20 and 22 exceeds the largest dimension of the scallops to help prevent fragmenting of the shells of scallops passed between the rollers. It is desirable that the space between the rollers be horizontally adjustable. As shown in FIG. 1, roller 22 may be moved to different horizontal positions relative to roller 20 to enable the rollers to agitate scallops of differing sizes without unduly fragmenting the scallop shells. For Calico scallops, the rollers are preferably spaced so that their cylindrical surfaces are about 4″ apart.

Rollers 20 and 22 are positioned above an immersion tank, generally 30, that contains a quantity of hot water 31, sufficient to permit complete immersion of the scallops. Tank 30 includes a water inlet conduit 32 for supplying water to the tank and a steam inlet conduit 34 for supplying a controlled source of steam to heat the water in the soak tank to the desired temperature level. An overflow conduit 35 is provided to control the liquid in the tank at a constant level, and a drain line 36 is provided to permit intermittent draining of the tank during cleanup operations.

In accordance with the invention, conveying means are provided in the immersion tank for transporting the scallops from the hot liquid at a predetermined time after immersion in the tank to preclude cooking of the scallop muscle. As here embodied, the conveying means includes an endless belt conveyor, generally 40, and a submerged inclined chute 38 which is positioned below drum rollers 20 and 22 to direct scallops onto the endless belt conveyor. Scallops dropped from between drum rollers 20 and 22 settle due to gravity onto inclined chute 38 and further settle due to gravity to the discharge end of the chute which is located adjacent endless belt conveyor. Conveyor 40 has its receiving end located below the surface of the hot liquid, and its discharge end located above the surface of the hot liquid.

Elevator conveyor 40 includes a porous belt 43 to assure efficient, uniform heat transfer from the liquid to all surfaces of the scallop shell. The pores in belt 43 allow liquid to flow into contact with the underside of the shells. Preferably belt 43 is of open mesh steel construction. Conveyor 40 further includes flights 42 on belt 43 and drive means (not shown) that moves the belt and flights at a speed at which the capacity of conveyor 40 exceeds the speed at which scallops can be elevated by elevator 12. This arrangement ensures that the scallops are removed from the hot liquid at a predetermined time after they are immersed in tank 30.

Scallops are discharged from conveyor 40 by gravity onto a chute 44 which directs them between a pair of driven rollers 46 and 48. Rollers 46 and 48 are spaced apart a distance, usually 3–4 inches for Calico scallops, which exceeds the largest dimension of the shell of the bivalves so that the rollers impart a mechanical shock to scallops passing therebetween, but do not excessively fragment the shells. As illustrated in FIG. 1, roller 48 may be spaced a variable horizontal distance from roller 46 so that scallops having different sizes of shells may be processed using the apparatus without excessively fragmenting the shells.

Drive means (not shown) are provided for driving the upper portion of rollers 46 and 48 towards each other. Preferably roller 46 has a steel exterior surface and roller 48 has an elastomeric surface, such as rubber. However, two steel rollers or two rubber rollers may be used.

Scallops passing between rollers 46 and 48 are dropped onto an inclined striker plate 50 which imparts another mechanical shock to the scallops. Striker plate 50 is positioned below the nip of rollers 46 and 48 and is mounted on a frame 52. The degree of inclination of the striker plate 50 is sufficient to cause the scallops to slide down the plate onto a vibratory shaker, described below.

Figure 2:
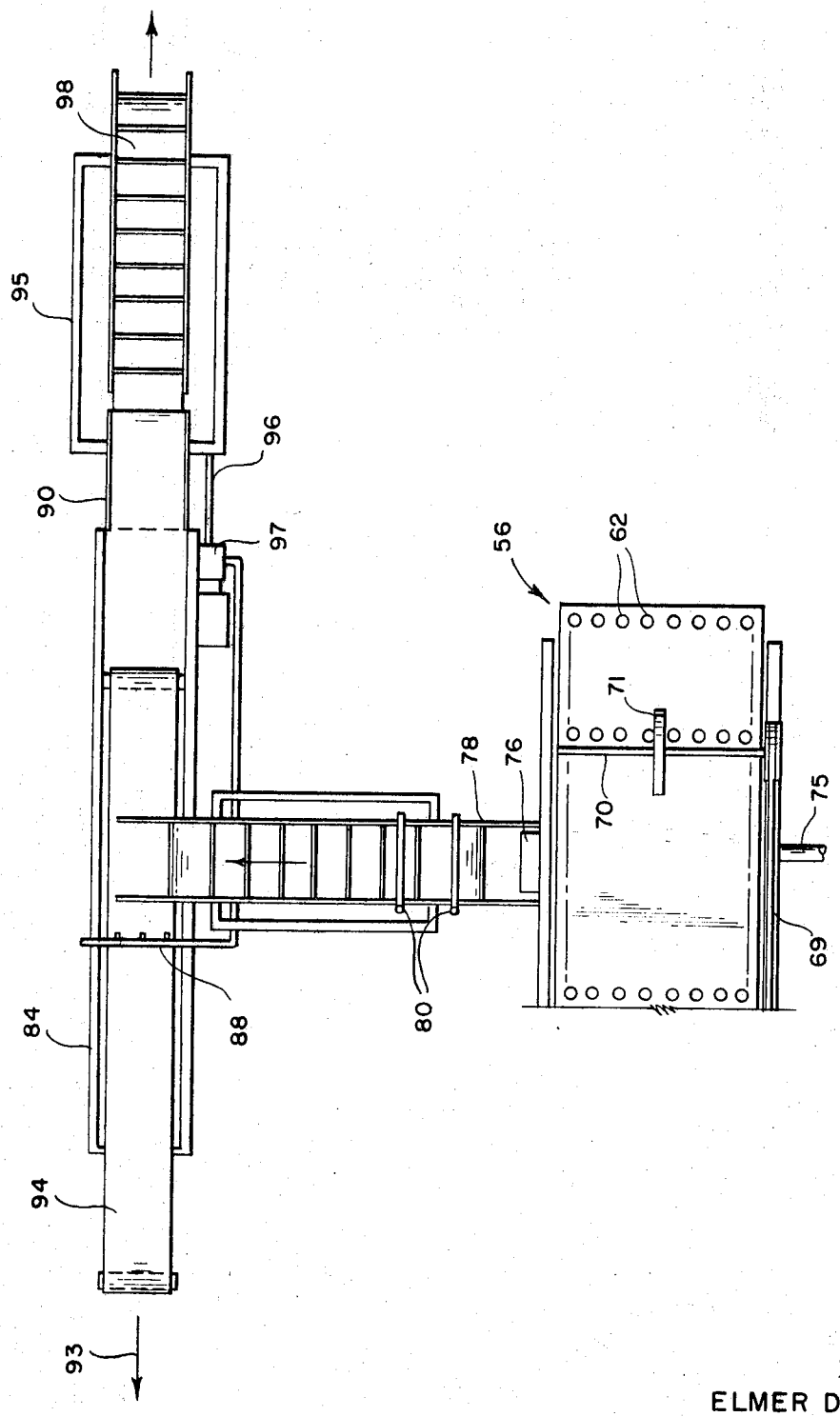
FIG. 2 is a plan view of a second portion of the apparatus of the invention.

In accordance with the invention, a vibratory shaker is provided to separate the scallop meat from the shell. As here embodied, and as seen in FIGS. 1 and 2, the vibratory shaker, generally 56, includes an inclined perforated plate 58, mounted on springs 59 which are supported by frame 60.

Perforated plate 58 contains openings 62 that are sized to be larger than the muscle and attached viscera to allow their passage through the plate, and smaller than unfragmented individual valves of the scallop shell and thus do not allow passage of the valves. The valves are vibrated along the length of the inclined perforated plate and discharged by gravity.

Drive means, generally 64 and best seen in FIG. 1, is provided for oscillating the perforated plate. Drive means 64 includes a motor 68 mounted on mounting 61 on frame 60, a belt 69, a driven shaft 70 on the perforated plate 58, and an eccentric disc 71 mounted on shaft 70. The rotation of eccentric disc 71 and shaft 70 produces a pulsating oscillation of perforated plate 58 in a direction substantially perpendicular to the plate.

Striker plate 50, perforated plate 58, and the remainder of the processing equipment that directly contacts the scallop muscle is preferably constructed of stainless steel or a nontoxic plastic or elastomeric material. While steel is a satisfactory material of construction for the portion of the apparatus that removes the shell of the scallop, it is desirable for sanitary purposes that the remainder of the equipment be of stainless steel or a nontoxic plastic or elastomeric material.

Scallop meat, including the muscle and viscera, pass through openings 62 in perforated plate 58 and into a collection pan 74, located below plate 58 as seen in FIG. 1. A water supply conduit 75 provides a stream of liquid to flume the scallop meats from pan 74 via outlet conduit 76. This stream of liquid also serves to wash some foreign matter such as sand from the scallop meats.

Strainer means are provided for separating the muscle and viscera from the stream of liquid. As here embodied, and as seen in FIGS. 2 and 3, the strainer means comprise an endless foraminous belt elevator conveyor 78.

A plurality of spray bars 80 are positioned above conveyor 78 to wash the scallop meats as they are moved thereunder. Small particles of sand or foreign materials may accumulate on the scallop meats due to contact on the vibratory shaker with the exterior of the shells. This foreign matter is washed from the meats and through the openings in the foraminous belt of conveyor 78 and effectively removed from the scallop meats.

Preferably conveyor 78 is flighted. Drive means (not shown) are provided for driving this conveyor to elevate the scallops and discharge them by gravity above a brine flotation tank.

In accordance with the invention, a brine flotation tank is provided for separating the muscle and viscera from any shell fragments produced during the shucking operation. The flotation tank contains a liquid having a specific gravity greater than the specific gravity of the muscle and viscera to permit the muscle and viscera to float, and having a specific gravity less than the specific gravity of the shell to permit any shell fragments to settle.

As here embodied and as shown in FIGS. 2 and 3, a brine flotation tank, generally 84, is provided that is filled with a salt brine 86. A spray bar 88 is located above tank 84 opposite an outlet conduit 90. Scallop meats dropped by gravity from conveyor 78 float on the brine and are moved by the flow of brine within tank 84, resulting from the constant addition of brine from spray bar 88 towards outlet conduit 90 located at the other end of the tank.

A shell removal conveyor 94 is provided in brine flotation tank 84 for convenient removal of shell fragments from the brine tank. Conveyor 94 runs a substantial portion of the length of the brine tank and has its inlet end below the level of the brine and its discharge end outside the tank to permit removal of shell fragments that settle thereon. Drive means (not shown) drive the endless belt conveyor 94 in a direction to permit removal of shell from the brine tank as shown by the arrow at 93.

An overflow tank 95 is positioned below the discharge end of conduit 90 to receive scallop meats and brine that flow by gravity from tank 84 via conduit 90. A conduit 96 connected to vessel 95 feeds brine from vessel 95 into a pump 97 that recirculates the brine into tank 84 via spray bar 88.

An elevator conveyor 98 is provided to remove scallop meats that are floating in vessel 95. Conveyor 98 has its receiving end located below the level of the brine in overflow tank 95 and its discharge end above the tank. Scallop meats floating in the brine of tank 95 are carried up and out of the brine by the conveyors.

Scallop meats removed from tank 95 by conveyor 98 are dropped onto the inlet end of an eviscerator, generally 100, described below.

Figures 5, 6:
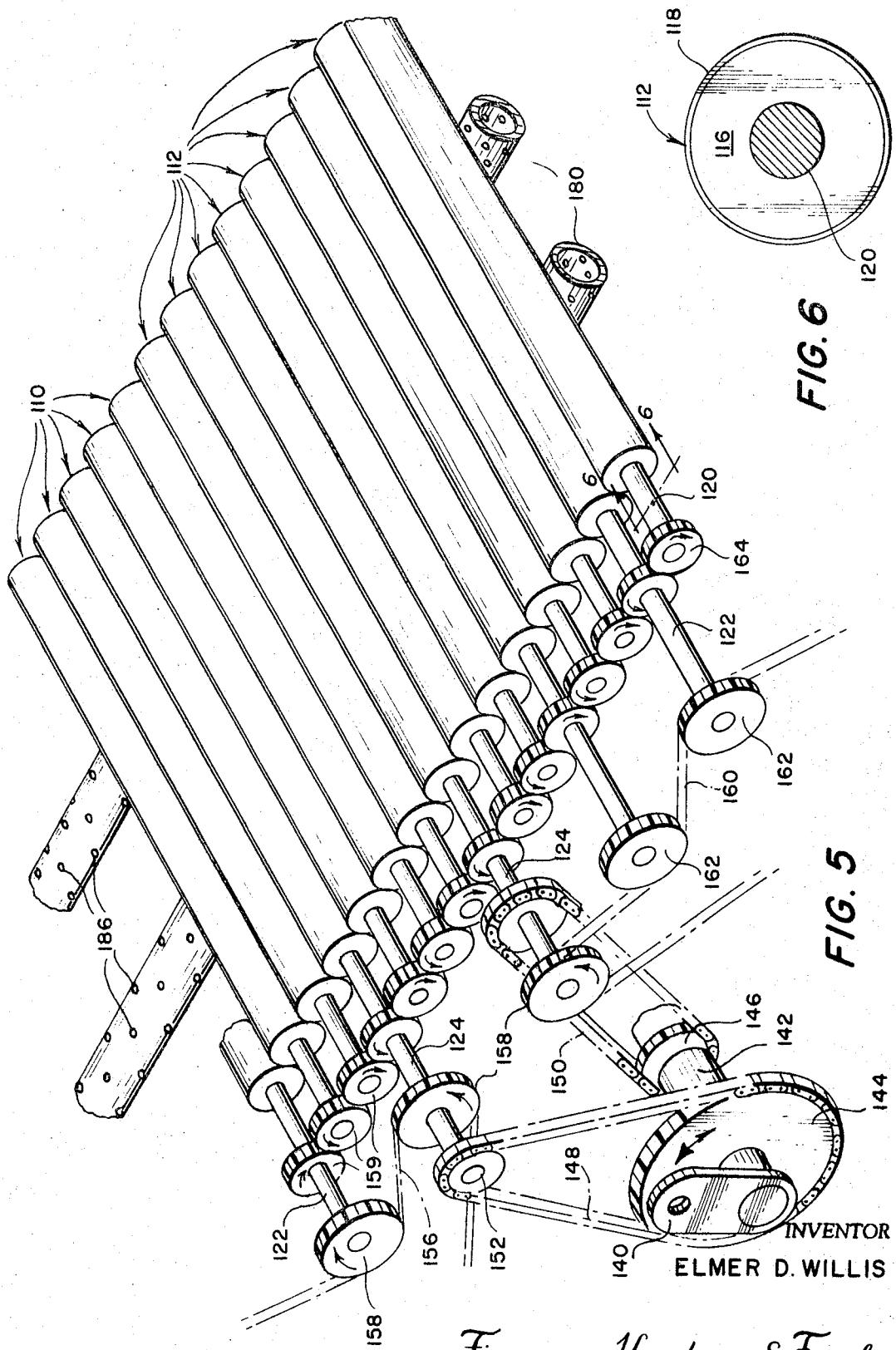
FIG. 5 is a schematic view of the rollers, the drive means, and the cleaning means that form a portion of the eviscerator of FIG. 4.
FIG. 6 is a section view of a roller taken along line 6—6 of FIG. 5.

An embodiment of the eviscerator of this invention is illustrated in FIGS. 4–8. As best seen in FIGS. 4 and 5, this eviscerator includes a plurality of rollers arranged to form a uniformly inclined path descending from the input end of the eviscerator to the output end of the eviscerator. Each of the rollers has its axis aligned transversely of the path and is positioned so that the surface of each intermediately positioned roller forms a nip with the adjacent roller on its input side and a nip with the adjacent roller on its output side. Drive means are provided for oscillating the rollers so the upper exposed portions of adjacent rollers are alternately rotated towards each other to pull viscera from the scallop muscles and through the nip of the rollers, and alternately rotated away from each other to permit the lower of the two rollers to advance the scallop down the inclined path.

As here embodied and as seen in FIG. 5, two groups of rollers are provided; namely, an upper group formed by rollers 110 and a lower group formed by rollers 112.

Preferably, each of the rollers 110 and 112 includes a rigid cylindrical drum 116 covered by an exterior layer 118 of protuberated, non-slip material as best seen in FIG. 6. A suitable commercially-available material for forming exterior layer 118 is sold by the Minnesota Mining and Manufacturing Company under the trademark "Scotch-Lag."

Exterior layer 118 preferably includes cork or rubber particles that form the proturberances, which are bonded together by a continuous phase of rubber-base adhesive. Proturberances formed by the cork or rubber particles are not easily loosened or removed from the surface of the rollers, and they do not swell or change in volume upon continued exposure to water.

The continuous phase of layer 118 is formed of a rubber-based or rubbery adhesive composition which is cured to a tough, non-brittle, wear-resistant state. At least one third of the total weight of the solids material of the continuous phase, exclusive of inorganic fillers, is rubber material. A variety of curable rubber-based adhesive compositions may be used as the continuous phase including synthetic elastomeric materials and natural rubbers or blends.

The protuberated non-slip nature of the external surface of 118 provides a good gripping surface for engaging the viscera and pulling it through the nips formed by the rollers. Outer layer 118 may be adhered or bonded to the surface of drum 116 by a variety of adhesive materials.

As best seen in FIG. 5, either a shaft 120, an extended shaft 122, or a primary drive shaft 124, extends from each roller 110 and 112 to permit transmission of power from drive means described below to the rollers. The shafts of each of rollers 110 and 112 is suitably journaled in a frame 114, best seen in FIG. 4.

The slope formed by the incline of the roller path from the horizontal is preferably 10 to 15°. The bank of rollers is uniformly inclined gradually from the input end of the apparatus to the discharge end of the apparatus with the rollers positioned so that each intermediately positioned roller forms a nip with the adjacent roller on its input side and a nip with the adjacent roller on its output side.

Preferably, the surfaces of the rollers do not touch, and are spaced apart far enough to permit their rotation without making frictional contact. For processing Calico scallops and bay scallops, the outside diameter of exterior layer 18 of rollers 110 is preferably about 1½ inches and the outside diameter of the exterior layer of rollers 112 is slightly smaller, about 1⅞₆ inches. The use of smaller rollers at the upper end of the eviscerator helps preclude pulling of the muscle through the lower rollers after the viscera is substantially removed. For eviscerating the larger sea scallops, larger roller diameters may be used.

In accordance with the invention, drive means are provided for oscillating the rollers so that the upper exposed surfaces of adjacent rollers are alternately rotated towards each other to pull viscera from the scallop muscles and through the nip of the rollers, and alternately rotated away from each other to permit the lower roller of the pair of adjacent rollers to advance the scallop down the inclined path.

As here embodied, a drive means is provided that is capable of rotating upper rollers 110 through a larger angle in each direction during each oscillation cycle than the angle through which the lower rollers 112 are driven. This larger angle of rotation and the larger size of rollers 110 both tend to permit rollers 110 to remove a large portion of the viscera. Smaller, more slowly rotating rollers 112 possess a lesser tendency to pull the adductor muscles through the rollers than the larger, more rapidly rotating rollers.

The drive means includes a motor 132, best seen in FIG. 4, and a speed reducer 134 that are capable of continuously rotating an arm 136. The rotary motion of arm 136 is transferred by connecting links 138 and 140 to oscillate shaft 142. A pair of sprockets 144 and 146 are mounted on shaft 142 and are oscillated thereby. As best seen in FIG. 5, sprockets 144 and 146 transmit an oscillatory motion through chain drives 148 and 150 to sprockets 152 and 154 on primary drive shafts 124.

The drive means for the upper rollers further includes a chain drive 156 and sprockets 158 that transmit power from shaft 124 to extended shafts 122.

Sprockets 158 are each of the same size so the drive shafts 122 of the upper rollers 110 are each rotated through the same angle during each oscillation cycle by chain drive 156.

As best seen in FIG. 4, chain drive 156 is arranged to counter-rotate adjacent drive shafts 122 of the upper rollers. The endless chain is trained in an undulating path around portions of the sprockets 158 and is kept in tension by a tension sprocket 157.

A gear 159 is provided on each of the shafts 120, 122, and 124 of the upper rollers. The gear 159 on the lowest roller 110 of the upper group of rollers and the gear 164 on the topmost lower roller 112 of the lower group of rollers are spaced apart and do not engage. The gears 159 are placed in engaging relationship with each other to transmit power from the extended shafts 122 to shafts 120.

In similar fashion, chain drive 160, sprockets 162, and gears 164 drive lower rollers 112.

As best seen in FIG. 5, by selecting a sprocket 144 that is larger than sprocket 146 and/or selecting a sprocket 152 that is smaller than sprocket 154, the upper rollers 110 can be driven through a larger angle in each direction during the oscillation cycles than lower rollers 112.

In accordance with the invention, spray means are positioned above the inclined path formed by the rollers for affecting the residence time of the scallops on the rollers by directing a fluid under pressure on the scallop meats positioned on the rollers. When the fluid is selected to be a liquid of low viscosity, such as water, the spray means also provides a lubricating film on the surface of the rollers that permits the scallop muscles to freely rotate about their cylindrical axes while supported by the rollers, thus exposing the entire peripheral surface of the muscles to the pulling action of the nip formed by the rollers.

Figure 7:
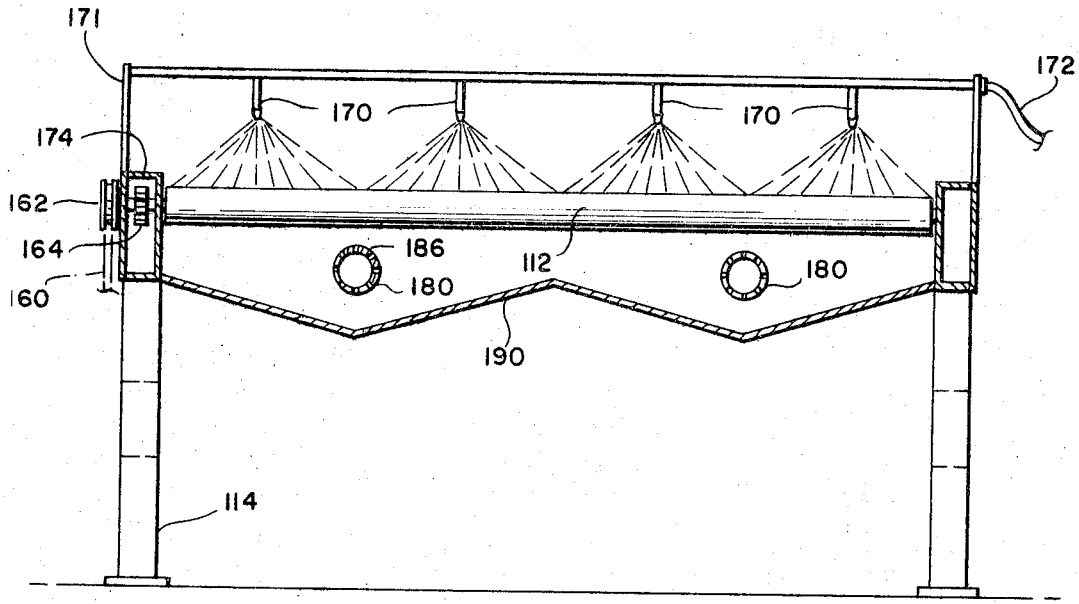
FIG. 7 is a section view of the eviscerator of FIG. 4 taken along line 7—7.

As here embodied and as best seen in FIG. 3, the spray means includes a plurality of spray nozzles 170 that are longitudinally spaced on frames 171 along the path. As seen in FIG. 7, the spray nozzles are also laterally spaced across the path. Spray nozzles 170 are each provided with an inlet conduit 172 connected to a source of fluid under pressure, preferably water.

As illustrated in FIG. 4, the direction of the fluid issuing from spray nozzles 170 is inclined upwardly with relation to the path formed by the rollers, and tends to impede the movement of the muscles down the path. By varying the angle of incidence of the fluid on the scallop muscles and by varying the intensity of the fluid spray, the residence time of the scallop muscles on the inclined path formed by the rollers can be varied. It is desirable that the spray means be so arranged that substantially the entire upper surface area of the rollers can be continuously sprayed with the fluid.

A splash cover 174, best seen in FIG. 7, is positioned over the portion of the eviscerator drive means that lies adjacent the rollers. Specifically, splash cover 174 covers gears 159 and 164 and separates the gears from rollers 110 and 112.

In accordance with the invention, cleaning means are provided for removing the viscera from the underside of the rollers. The cleaning means prevent viscera from accumulating on the rollers with subsequent reduction of the eviscerating efficiency of the apparatus.

As here embodied and as best seen in FIGS. 5 and 7, the cleaning means includes a pair of rotating spray heads 180 positioned below the rollers to direct streams of water under pressure at the lower portion of the rollers. Viscera are picked off the rollers by the water and flushed from the rollers.

As best seen in FIG. 4, water under pressure is supplied to the spray heads by inlet conduit 182, and drive means 184 is provided for continuously rotating the spray heads. By continuously rotating the spray heads, the discharge openings 186 of the spray heads, best seen in FIG. 5, are prevented from becoming plugged with viscera that are removed from the bottom surface of rollers 110 and 112.

An inclined pan 190 having an outlet conduit 192 at its lower end is provided for collecting the viscera which are flumed down the pan by the water supplied by the rotating spray heads.

The operation of the apparatus of FIGS. 1 and 3 has been explained during the preceding description.

Figure 8:
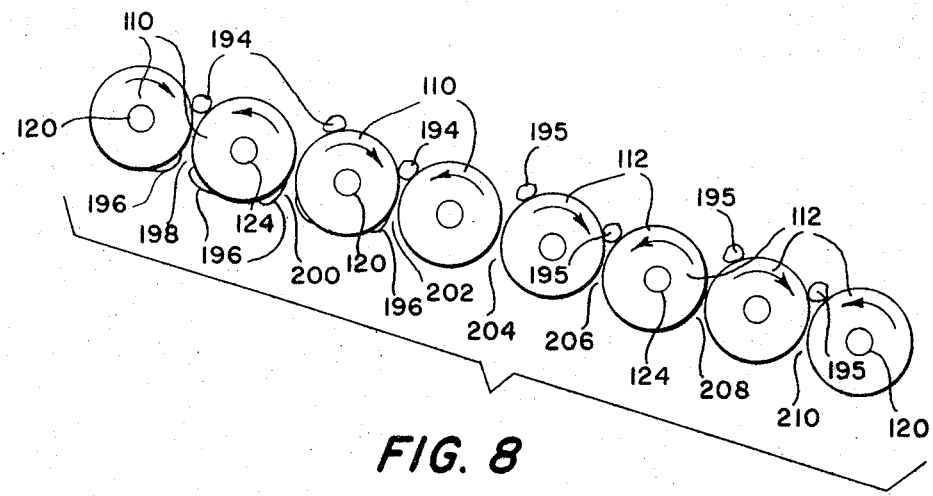
FIG. 8 is a schematic side elevation of the eviscerator rollers of this invention illustrating their rotational relationship.

The operation of the eviscerator is best understood with reference to FIGS. 4, 5, and 8. As seen in FIG. 4, drive means including motor 132 and speed reducer 134 are provided to oscillate shaft 142. When shaft 142 and sprockets 144 and 146 are driven counterclockwise as depicted by the broad arrow shown on sprocket 144 in FIG. 5, sprockets 158 and 162, gears 159 and 164, and rollers 110 and 112 are driven as depicted by the arrows in FIGS. 5 and 8. It should be understood that the direction of rotation of sprockets 158 and 162, gears 159 and 164, and rollers 110 and 112 is reversed during each oscillation cycle when shaft 142 and sprockets 144 and 146 are driven clockwise as depicted by the thin arrow on sprocket 144 in FIG. 5.

With reference to FIG. 8, a scallop meat, generally 194, comprising an adductor muscle 195 and attached viscera 196 is positioned above a nip 198 formed by the two uppermost rollers 110 there illustrated. While the upper exposed portions of the rollers forming nip 198 are rotating toward each other as shown in FIG. 8, a frictional pulling force is exerted on the viscera which tends to pull it from the muscle and through the nip. Removed viscera 196 is shown on the lower portion of the rollers.

As seen in FIG. 8, the lower roller of the two adjacent rollers that form nip 198 also forms a nip 200 with the roller on its discharge end. At the time the upper portions of the rollers forming nip 198 are rotating toward each other. The upper portions of the rollers forming adjacent nip 200 are rotating away from each other and tend to advance a scallop towards nip 202. This relationship is repeated down the path formed by the rollers. Thus, eviscerating operations simultaneously take place at nips 198, 202, 206, and 210, while as described below, advancing operation take place at nips 200, 204, and 208. When the direction of rotation of rollers is reversed during each oscillation cycle, the operation performed at each nip is changed as described below.

When the direction of the rotation of the rollers forming nip 198 is reversed, from that shown in FIG. 8, the lower of the two rollers forming this nip then rotates in a direction that tends to advance the scallop to a position above nip 200. The oscillation of the rollers and the action of the spray means, best seen in FIG. 3, controls the rate of advance of the scallop muscle down the path formed by the rollers. Thus, the scallops are eviscerated as they "walk" down the inclined rolls. The scallops tend to "hop" over one roll each oscillation until they reach the bottom of the machine.

Viscera removed from the adductor muscles by the repeated pulling action of the nips formed by rollers 110 and 112 is cleaned from the rollers by water from spray pipes 180, best seen in FIGS. 5 and 7. The spray emitting from these pipes contacts the underportion of the rollers. The viscera are forced off the rollers by the water, drop into pan 190, and are flumed therefrom by the water supplied by the rotating spray pipes 180. The viscera may be collected from this water stream and used in fertilizer, etc.

Scallop muscles after traversing the length of the roller path fall into collecting means 212, seen in FIG. 4, positioned adjacent the lowermost roller 112. These scallop muscles are substantially free of viscera and are a commercially marketable product.

The invention in its broader aspects is not limited to the specific details shown and described, and departures may be made from such details within the scope of the accompanying claims without departing from the principles of the invention and without sacrificing its chief advantages.

What is claimed is:

1. A method for extracting the adductor muscle from scallops comprising:
    (a) immersing unshucked scallops in a hot liquid bath for a time period sufficient to lessen the adhesion of the adductor muscle and the shell, but insufficient to substantially denature the muscle protein;
    (b) mechanically agitating the shell and muscle to cause the release of the muscle and attached viscera from the shell;
    (c) separating large shell fragments from the muscle and viscera;
    (d) floating the muscle and viscera in a brine solution to separate small shell fragments from the muscle and viscera;
    (e) removing the viscera from the muscle by placing the scallop muscle and attached viscera on the upper surface of an inclined path formed by a plurality of rollers having their axes transverse of the path, pulling the viscera from the scallop muscles and through the nip formed by adjacent rollers by rotating the upper portion of adjacent rollers towards each other, and removing the viscera from the surface of the rollers below the inclined path.

2. The method of claim 1 wherein the scallops are immersed for about seven seconds in a hot water bath held at about 195° F.

3. The method of claim 1 wherein the scallop muscle is moved down the inclined path by intermittently rotating the upper portion of the adjacent rollers away from each other to permit the lower of the two adjacent rollers to advance the muscle down the path, and by spraying a flow of fluid on at least some of the muscles to affect their rate of movement down the path.

4. The method of claim 1 wherein agitating the shell and muscle includes passing the shell and muscle between a pair of rollers having their upper portions rotating towards each other and spaced a distance apart that exceeds the largest dimension of the scallop shells to avoid excess fragmentation of the shells.

5. The method of claim 1 which includes the steps of contacting the muscle and viscera with a stream of water after the separation of the large shell fragments from the muscle and viscera to wash foreign matter therefrom, and straining the muscle and viscera from the stream of water.

6. A method for extracting the adductor muscle from scallops comprising:
    (a) immersing unshucked scallops in a hot liquid bath for a time period sufficient to lessen the adhesion of the adductor muscle and the shell, but insufficient to substantially renature the muscle protein;
    (b) mechanically agitating the shell and muscle to cause the release of the muscle and attached viscera from the shell;
    (c) separating shell fragments from the muscle and viscera; and
    (d) removing the viscera from the muscle by placing the scallop muscle and attached viscera on the upper surface of an inclined path formed by a plurality of rollers having their axes transverse of the path, pulling the viscera from the scallop muscles and through the nip formed by adjacent rollers by rotating the upper portion of adjacent rollers towards each other, and removing the viscera from the surface of the rollers below the inclined path by spraying a flow of water at the undersurface of the rollers.

References Cited

UNITED STATES PATENTS

| | | | |
|---|---|---|---|
| 2,047,688 | 7/1936 | Jenkins | 17—48 |
| 2,337,188 | 12/1943 | Geldermans et al. | 17—48 |
| 3,007,801 | 11/1961 | Lapeyre et al. | 17—48X |
| 3,129,456 | 4/1964 | Renfroe | 17—45 |
| 3,177,522 | 4/1965 | Renfroe | 17—53 |
| 3,203,034 | 8/1965 | Matzer et al. | 17—74 |
| 3,417,423 | 12/1968 | Meyer | 17—53 |

FOREIGN PATENTS

| | | | |
|---|---|---|---|
| 551,674 | 3/1943 | Great Britain | 17—74 |

LUCIE H. LAUDENSLAGER, Primary Examiner

U.S. Cl. X.R.

17—74